June 1, 1965 J. R. VENABLE 3,186,656
PRELOADED BALL BEARING CASTING REEL
Filed June 13, 1962
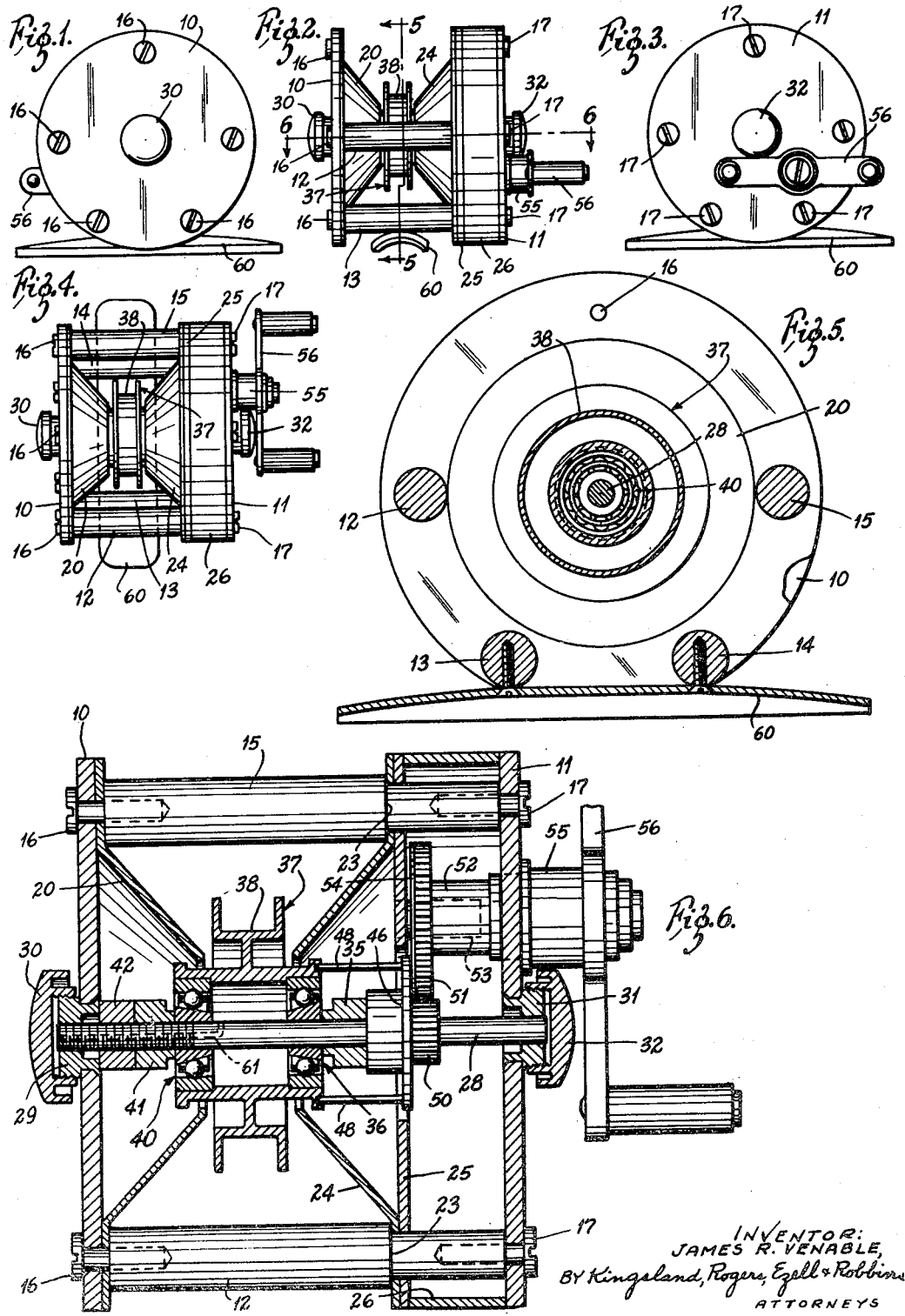
INVENTOR:
JAMES R. VENABLE,
BY Kingsland, Rogers, Ezell & Robbins
ATTORNEYS 3,186,656
PRELOADED BALL BEARING CASTING REEL
James R. Venable, Roxana, Ill.
Filed June 13, 1962, Ser. No. 202,162
4 Claims. (Cl. 242—84.1)

The present invention relates to a casting reel, and particularly to a contest casting reel wherein distance, or length of the cast, is the primary feature of the reel and objective of its design.

This reel has a frame, with end plates, a shaft, a spool on the shaft, winding mechanism, and a clutch for selective operation of the spool by the handle. And a particular feature of the reel is that the spool is combined with a particular type of ball bearings on the shaft that can be loaded to a very small degree to provide just the right resistance to rotation of the spool that will prevent improper and faulty casting.

It is an object of the invention to provide a reel of this kind wherein the spool is ball bearing mounted, and wherein the drag can be provided in the bearings themselves, so that the loading does not in any way interfere with the uniform rotation of the spool. Stated otherwise, it is an object to provide a reel wherein appropriate drag or load can be applied to the spool without introducing lateral or other unsymmetrical forces that tend to cause irregular spinning or undue and irregular wear.

It is a further object to provide a reel of this design wherein the reel frame is rigid, and the spool and guide plates are so designed that the line will properly channel in the spool.

Other objects will appear from the drawings and description.

In the drawings:

FIGURE 1 is a side elevation of the reel from the outboard side;

FIGURE 2 is an edge elevation thereof;

FIGURE 3 is a side elevation from the inboard side;

FIGURE 4 is a top view;

FIGURE 5 is an enlarged transverse section taken on the line 5—5 of FIGURE 2; and FIGURE 6 is a further enlarged diammetrical section on the line 6—6 of FIGURE 2.

The reel comprises a frame structure made up essentially of an outboard end plate 10, an inboard end plate 11, and four posts 12, 13, 14 and 15. Screws 16 secure the outboard end plate 10 to the posts, and screws 17 secure the inboard end plate to the posts.

Interposed between the outboard end plate 10 and the posts, and secured by the screws 16, is an outboard feeder plate 20, having a frusto-conical middle portion extending inwardly as shown. At the inboard side, the posts 12–15 have reduced end parts providing shoulders 23. A spacer ring 26 is interposed as shown, between a mounting plate 25 and the inboard end plate 11. An inboard feeder plate 24, similar to plate 20, is interposed between shoulders 23 and mounting plate 25.

The frame aforesaid supports a central axial shaft 28. It is mounted non-rotatably in a bushing 29 in the outboard end plate 10 which bushing receives a threaded dust cap 30, and similarly in a bushing 31 in the inboard end plate 11 which bushing 31 has a threaded dust cap 32. This shaft passes through central openings in the two feeder plates 20 and 24 and the mounting plate 25.

The shaft 28 has a collar 35 pressfitted onto it, and if desired, the collar may be spot-soldered or brazed onto the shaft. The collar 35 has its end portion of reduced diameter for a purpose to appear. The collar 35 impinges upon the inner race of a ball bearing 36, which race is closely but movably mounted on the shaft 28. The outer race of the ball bearing is mounted within an appropriate circular recess in a spool 37 that may be made of light metal, and which preferably has the shape as indicated with a circular channel 38 into which the casting line may be wound by operation of the reel. The other or outboard end of the spool 37 similarly is mounted upon a bearing 40 that is like the bearing 36. Both of these bearings are miniature ball bearings. Suitable bearings for this purpose are numbers S518M, S518MA or S518MB manufactured by Miniature Precision Ball Bearing Company. They are of a higher speed quality than ordinary ball bearings and are built and designed to carry a predetermined load for the control of their speed. In each bearing the inside race is movable relatively to the outside race, allowing adjustments of the load on the balls by changes in the races as small as $\frac{1}{10000}$ inch in the clearances. It is highly important that these bearings can provide adjustments of load of such micro-metric amounts, because the ultimate loading on the spool is actually very small.

In order to have proper action, the spool 37 is reamed using no more than .0002 pressure fit on each outside race. The shaft race is given approximately the same tolerance. These fits minimize distortions of the bearings by their mountings. The bearings are assembled in the spool and then installed on the shaft, until the inner race of the bearing 36 abuts against the reduced portion of the collar 35. Thereupon a collar 41 is threaded onto the threaded end of the shaft 28 as indicated in FIGURE 6 and is disposed against the inner race of the bearing 40. The collar is tightened to where the bearing or the spool has no side play but the spool runs freely. Thereupon the lock nut 42 is applied to the shaft back of the collar 41. With spanner wrenches the collar is tightened to where the spool 37, when flipped by the finger, will run the spin for no more than $\frac{4}{100}$ of a second. This is usually the desired preloading for a distance casting spool. Further adjustments are made in the field in use of the reel. The initial factory adjustments should be done at a fixed temperature such as 80°.

From the foregoing it can be seen that when the frame is assembled, the shaft 28 must have preassembled with the several parts mentioned prior to its being put into its bushings 29 and 31, after which the adjustments as described may be made. It will also be evident from FIGURE 6 that the channel 38 on the spool projects radially outwardly beyond the innermost parts of the two feeder plates 20 and 24. The hub portions of the spool extend axially through the central holes in the feeder plates and extend to the under side of the feeder plates.

Also mounted on the shaft 28 but inboard of the first named collar 35 is a clutch element 46. It comprises a hub that is freely rotatable on a shaft 28 and a flange. The flange supports a plurality of pins 48 that are parallel to the shaft 28 and which project leftwardly in FIGURE 6 so that they may engage in holes in the inboard face of the hub of the spool 37.

The clutch 46 is rotatably and axially movable on the shaft. It receives, preferably by an interfit of teeth, a pinion gear 50 that is also rotatably mounted on the shaft 28. The gearing and handle mechanism are not per se part of the present invention. Suffice it to describe at this time that turning of the pinion 50 causes the clutch element 46 to rotate on the shaft 28 and when the pins 48 are engaged in the holes in the spool 37, rotation of the pinion 50 will cause rotation of the spool. If the clutch element 46 slides to the right in FIGURE 6, it will disengage the pins 48 and the spool 37 will be free to rotate independently. It can be seen that this clutch arrangement provides for a very free rotation of the spool when the clutch is disengaged, the spool being in such situation almost entirely symmetrical and balanced about all axes.

A gear 51 meshes with the pinion 50. This gear 51 has an integral hub 52 mounted on a pin 53 that is secured permanently in the plate 25. The gear has a wear plate 54 on its lefthand face in FIGURE 6, which wear plate can engage against the right-hand face of the circular clutch element and urge the same into clutch engaging position. However, the pinion can slide on the pin 53 to the right in which event it can disengage the plate 54 from the clutch element 46 and permit the clutch to be disengaged.

The hub 52 passes through a bushing 55 in the end plate 11 and is engaged with a handle 56. The details of this need not be described since they do not per se form a part of this invention. Rotation of the handle rotates the gear 51 and hence the pinion 50. However, if the handle is pulled to the right in FIGURE 6, it will draw the gear 51 to the right so that the clutch is disengaged. Removal of the pressure of the plate 54 on the clutch permits the projecting pins 48 to be ejected from the shallow recesses in the hub of the spool, which action occurs without need of a spring.

The two cross bars or posts 13 and 14 support a rod clip 60 by screws as indicated in FIGURE 5.

*In use*

This reel is designed particularly for contest casting. To give an indication of its size in the normal embodiment, it may be noted that the space between the end plate 10 and the supporting plate 25 is approximately one inch. However, features of it, especially as to the mounting of the spool, can be used to advantage on reels of other design.

The line is, of course, received in the channel 38. It is necessary for best casting results to have a very slight resistance to rotation of the spool. This can be accomplished in a particularly desirable manner in the present reel because of the manner in which the miniature ball bearings are incorporated into the present reel. The bearings themselves not only afford a very free and uniform rotation of the spool, but do so in a way that permits a very light, but definite, loading, without altering the uniformity of the rotation.

If the threaded collar 41 is turned by a spanner wrench in a direction to move it closer to the collar 35, this displaces the inner race of the bearing 40 toward the inner race of the bearing 36. Since the two bearings are identical, and since the races are so shaped, a very small amount of adjustment of the threaded collar 41 will produce a minute change in the load on both bearings 40 and 36. It changes both bearings simultaneously because of the fact that the rotation of the collar 41 changes the distance between it and the collar 35 is the equivalent in effect to equal adjustment of both inner races simultaneously.

On the other hand, if the collar 41 is loosened on its threads, there will be a relief of this loading. In this manner the loading on the spool can be made very precise and very even. After the collar 41 is thus brought to its proper position, it is held there carefully while the lock nut 42 is brought firmly against it to prevent its changing its position.

An appropriate lubricant may be used to the extent necessary. A tiny hole is drilled in the shaft as shown at 61. When the dust cap 30 is removed, lubricant can be supplied through this hole and it will afford proper lubrication to the bearings.

Various changes and modifications may be made within the process of this invention as will be readily apparent to those skilled in the art. Such changes and modifications are within the scope and teaching of this invention as defined by the claims appended hereto.

What is claimed is:

1. In a casting reel: a frame having opposite end plates and a plurality of posts supporting the plates in spaced, rigid relationship; a shaft removable non-rotatably fixed in the end plates and extending between them; a collar fixedly positioned on the shaft, a pair of ball bearing units, each including an outer race, balls, and an inner race, each inner race being freely slidably mounted on the shaft, one of the races of each bearing having varying diameters so that upon relative axial movement between the races of each bearing the balls thereof are tightened or loosened; the inner race of the first bearing abutting the collar to limit its axial movement in a direction to loosen the balls; the inner race of the second bearing being on the shaft in spaced relation to the first and disposed so that movement toward the first inner race tightens the balls; a line spool having a hub with a central opening through which the shaft extends, the outer races of the two bearings being fixedly mounted in spaced relation in the opening in the hub of the spool, so that the spool may rotate freely on the shaft, and the distance between the outer races is maintained constant; an adjustment collar threaded onto the shaft and engageable against the second inner race, so that it can press the said race toward the first inner race and tighten both bearings; a lock nut threaded onto the shaft to bind the threaded collar; winding means including a crank mounted on the frame eccentrically of the shaft; a clutch including a slidable gear-toothed element mounted rotatably and slidably on the shaft; projecting means extending axially from the toothed element radially outside of the ball bearing, to engage the hub of the spool outside the outer bearing race, said hub having cooperating means to receive the projections to clutch the spool and toothed element together when the toothed element is pushed toward the spool; pinion means on the frame eccentrically of the shaft operated by rotation of the crank, meshed with the toothed element; feeder plates secured to the frame, extending inwardly toward the shaft and toward each other, with central openings to receive and overlie the ends of the hub of the spool; the spool having a peripheral line channel with its side walls radially outwardly from, but axially adjacent to, the inner ends of the feeder plates.

2. The reel of claim 1, wherein the spool is formed of one piece of material, the hub having a medial radially projecting, narrow web, and the line channel being of U-shaped section joined to the outer part of the web, the hub having a greater axial dimension than the channel, so that the feeder plates extend inwardly over the ends of the hubs radially inward of the line channel, the spool being symmetrical about a medial plane transverse to the axis.

3. The reel of claim 1, wherein the inner races are frusto-conical, so that axial movement displaces the balls radially relative to the outer race.

4. The reel of claim 1, wherein there is a lubricant passage from one end of the shaft, opening out between the bearings.

References Cited by the Examiner

UNITED STATES PATENTS

| | | | |
|---|---|---|---|
| 616,205 | 12/98 | Shamp. | |
| 842,551 | 1/07 | Hunter | 242—84.54 X |
| 1,189,232 | 7/16 | Benjamin | 242—84.44 |
| 1,345,072 | 6/20 | Case | 242—84.44 |
| 2,257,023 | 9/41 | Ray | 242—84.44 |
| 2,613,045 | 10/52 | Kester | 242—84.5 |
| 2,884,211 | 4/59 | Holahan | 242—84.2 |

MERVIN STEIN, *Primary Examiner.*

JOSEPH P. STRIZAK, RUSSELL C. MADER,
*Examiners.*